Sept. 29, 1964  G. F. LOOK ETAL  3,150,387
FOAM GENERATOR

Filed May 2, 1962  2 Sheets-Sheet 1

INVENTORS
GEORGE F. LOOK
FRANK M. BALLENTINE, JR.

BY

ATTORNEY

Sept. 29, 1964   G. F. LOOK ETAL   3,150,387
FOAM GENERATOR

Filed May 2, 1962   2 Sheets-Sheet 2

INVENTORS
GEORGE F. LOOK
FRANK M. BALLENTINE, JR.

BY

ATTORNEY 3,150,387
FOAM GENERATOR
George F. Look and Frank M. Ballentine, Jr., Hampton, Va., assignors to the United States of America as represented by the Administrator of the National Aeronautics and Space Administration
Filed May 2, 1962, Ser. No. 192,016
5 Claims. (Cl. 9—8)
(Granted under Title 35, U.S. Code (1952), sec. 266)

The invention described herein may be manufactured and used by or for the Government of the United States of America for governmental purposes without the payment of any royalties thereon or therefor.

This invention relates generally to a generator for the controlled production of plastic foam, and relates with particularity to a space vehicle instrument payload package returnable through the atmosphere from space for a water landing including such a foam generator utilizable to fill an elastomeric flotation bag carried by the instrument package with plastic foam to provide durable buoyant sustention for the instrument package while it awaits recovery from the water.

In the field of space exploration, instrument payload packages rocket launched into space on probe or orbital missions and returnable from space through the atmosphere are generally designed to land in a large body of water for the minimization of landing impact loads. According to current practice, these instrument packages are usually provided with means to chemically produce a gas to inflate an elastomeric flotation bag carried in the package upon, or immediately prior to, impact of the package with the water. This prior art practice, however, does not completely assure that such instrument packages will be recovered from the water, since occasionally these packages are not quickly located and, due to numerous hazards, the inflated bag sustains punctures, leading to loss of the inflating gas and subsequent loss of the instrument package, which may render an otherwise successful space mission substantially worthless. This problem may be solved, however, by the use of foamed plastic, or other buoyant substantially stable materials, as the inflation medium for such buoyancy providing systems, since this particular type of inflation medium would not be lost due to minor bag punctures.

As a practical matter, inflatable flotation bags employed in space payload water recovery systems must remain deflated during accomplishment of the space mismission in order to conserve required storage space. Also, to minimize weight, it is essential that the space vehicle palyload package be provided with a simple and compact flotation bag inflation medium source. It is known that polyether resins, when combined with an organic polyisocyanate catalyst, will produce an expanded plastic foam that hardens immediately into a spongy, low density, buoyant mass strongly adherent to the walls of the container in which the materials are brought together or to the interior of a container or envelope into which the foam is allowed to flow. Most foam producing reactions of this nature require the use of bulky and heavy mechanical mixing apparatus to assure predictable and reproducible results, and are obviously not readily adapted for use in space vehicle payload packages. The present invention, however, provides a solution of these problems.

Accordingly, an object of the present invention is to provide a new and improved plastic foam generator.

An additional object of the instant invention is the provision of a new and improved mixing arrangement for plastic foam producing ingredients.

Another object of this invention is to provide a novel flotation system for a space vehicle payload instrument package.

A further object of the present invention is the provision of a novel rupturable container wall separating reactive chemical ingredient chambers.

Still another object of the instant invention is to provide a novel inflation apparatus for an inflatable flotation bag provided in a space vehicle instrument payload recovery system.

Yet another object of this invention is to provide a new lightweight, and inexpensive plastic foam generating apparatus.

In accordance with the present invention, the foregoing and other objects are attained by including, within a space vehicle payload package designed to land in a body of water, a foam generator connected for fluid communication with an inflatable elastomeric bag or envelope. The foam generator includes a casing or housing member sealed at one end and attached to an instrument package. A pair of sealed containers, one containing a foam producing resin and the other a catalytic agent combinable therewith to initiate the foam producing reaction, are positioned in abutting relationship within the casing member, and a mild detonating fuse is positioned between the abutting surfaces of the containers. Upon ignition of the detonating fuse, in response to a suitable signal, a substantial surface area of each container is ruptured, thereby combining the resin and the catalyst the chemically produce a quantity of plastic foam. The plastic foam, thus produced, expands to effect inflation of the elastomeric bag and provide subsequent buoyancy for the attached instrument package.

A more complete appreciation of the invention and many of the attendant advantages thereof will be readily apparent as the same becomes better understood by reference to the following detailed description when considered in connection with the accompanying drawings wherein.

Figure 1:
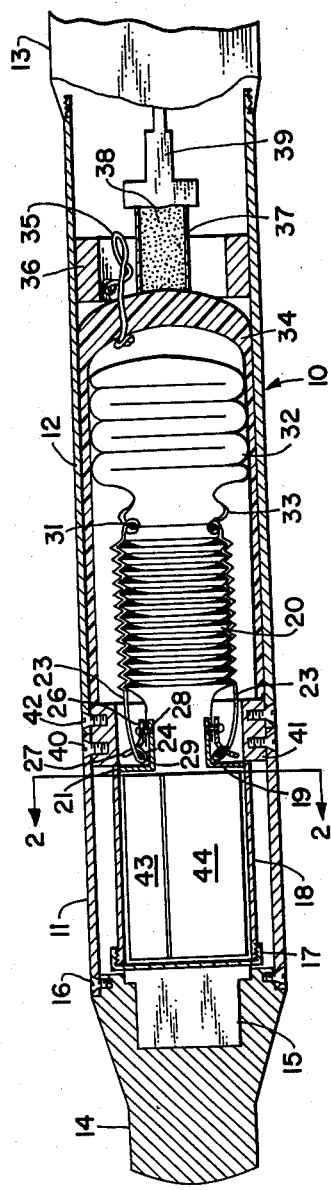
FIG. 1 is an elevational view, partially in section, of a space vehicle payload package including a flotation system employing the foam generator of the present invention.

Referring now to the drawings, wherein like reference numerals designate like or corresponding parts throughout the several views, and more particularly to FIG. 1, there is shown a space vehicle payload stage, generally designated by the reference numeral 10, having a forward casing 11, a central main casing 12, a rearward booster section 13, and a nose cone 14. The booster section 13, as well as the remaining external vehicle structure, may be of any conventional design and forms no part of the present invention. Nose cone 14 may, for example, be of the ablation heat dissipation type, and is adapted to enclose an instrument package 15; nose cone 14 being secured to casing 11 by conventional means such as bolts 16. Instrument package 15 is attached to disk shaped end cover member 17 of foam generator casing 18 by suitable conventional fastening means, not shown.

Foam generator casing or housing 18 is a tubular substantially cylindrical shaped, lightweight, metallic member closed at one end by cover member 17 threadedly connected thereto, with the other end thereof closed by a disk shaped member 19 having a central tubular portion of reduced diameter. This tubular portion is internally received by the open end of a folded, inflatable, elastomeric bag or envelope 20. Disk shaped member 19 is attached to tubular housing 18 at interface 21 by suitable conventional means. The inflatable bag or envelope 20 may be formed of any suitable elastomeric material, such as a plastic or rubber.

A plurality of longitudinally extending flexible tapes or ribbons 23 are equidistantly radially secured to the exterior surface of inflatable bag 20 for reinforcement thereof, with both ends of the ribbons extending beyond the longitudinal extremities of bag 20; these extreme ends being redoubled to form a plurality of closed eyelets or loops 24 at opposite ends of ribbons 23, the function of which will be more fully explained hereinafter. A metallic retaining band 26, having an integral flared skirt portion 27, is securely fastened to the tubular portion of member 19 by a plurality of screws 28. The open end of bag 20 is disposed between band 26 and the tubular portion of member 19 prior to assembly of these parts, and the bag 20 is thus maintained in fluid tight relationship with casing 18 of the foam generator.

A circumferential ring member 29, of suitable lightweight material having high tensile strength, such as aluminum, is positioned around the tubular portion of member 19 and further is threaded through ribbon loops 24 at the open end of bag 20. Ring member 29 is maintained in position by flared skirt 27, which in turn is provided with a plurality of radially disposed perforations equal in number to, and through which may pass, ribbons 23. A second circumferential ring member 31, which may be identical to ring 29, is adapted to pass through the ribbon loops 24 disposed at the closed end of inflatable bag 20. In addition, an initially folded parachute 32 may be secured to ring member 31 by means of risers or shroud lines 33 through a suitable impact release mechanism, not shown.

A substantially cup-shaped ejector piston member 34, of rigid plastic or other suitable material, is slidably received within vehicle casing 12, with the base portion thereof adapted to abut a support ring 36 fixedly attached within vehicle casing 12. A length of flexible rope 35 of sufficient length and strength, the function of which will be more fully explained hereinafter, is secured at one end through an opening in ejector piston 34 with the other end being attached to support ring 36. Integral with the central base of ejector piston 34 is a tubular external extension 37, having a propellant charge 38 disposed therein, which is adapted to be ignited by a suitable delay igniter 39. The forward open end of ejector piston 34 bears against a retainer ring 41 which is attached to the interior of main vehicle casing 12, for example, by a plurality of shear bolts 42, and which is further and fixedly attached to the interior of forward casing 11 by a plurality of rigid bolts 40. The base of ejector piston 34, as well as one end of foam generator casing 18, may also be provided with small openings, not shown, for the passage therethrough of electric lead wires, as will be more fully explained hereinafter.

Figure 2:
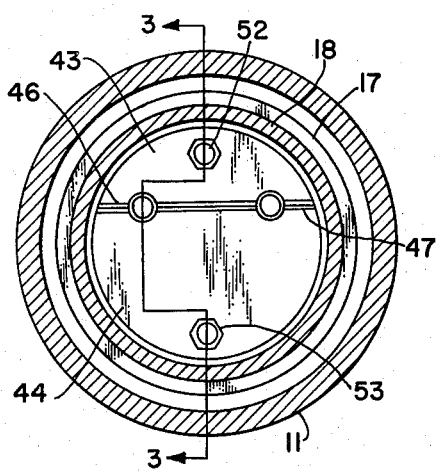
FIG. 2 is a view taken along the line 2—2 of FIG. 1.
Figure 3:
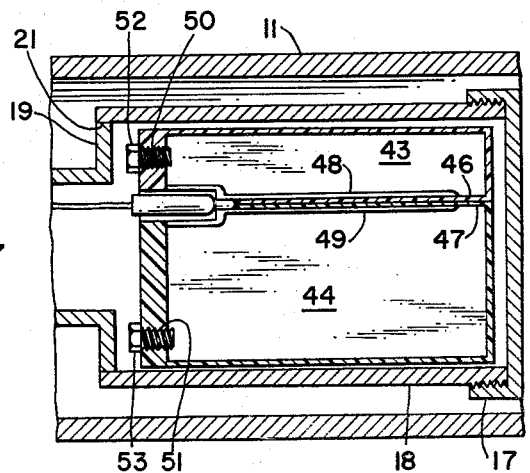
FIG. 3 is a sectional view of the foam generator of the present invention taken along the line 3—3 of FIG. 2.
Figure 4:
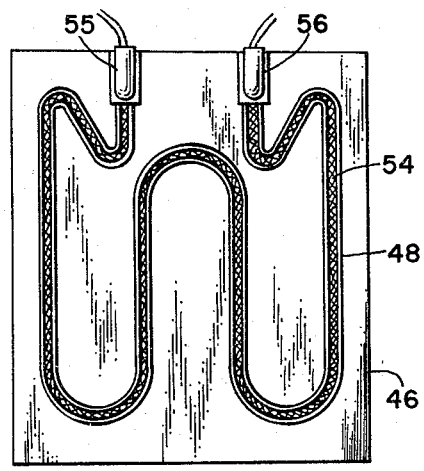
FIG. 4 is an elevational view of the flat side wall of one of the two containers employed in the foam generator, and illustrates one form of wall rupturing device; and, FIG. 5 is a schematic view of the payload package with the flotation system operably deployed as it would appear afloat in a body of water.

Foam generator casing 18, referring now more particularly to FIGS. 2–4, contains a pair of substantially semicylindrical containers 43, 44 extending substantially the entire length thereof; each container 43 and 44, respectively, having a substantially identical flat side wall or bulkhead 46, 47. The bulkheads 46 and 47 are disposed in juxtaposed relation. Containers 43 and 44 may be cast or molded from any suitable lightweight material, such as a plastic; and bulkheads 46, 47 are each provided with identical opposing continuous grooves 48, 49, respectively, formed in the surface thereof. Grooves 48, 49 are constructed so as to form a single sinuous passageway, beginning and ending at one end of containers 43, 44 when the containers are positioned adjacent each other within foam generator casing 18. Containers 43, 44, as apparent from the drawings and for reasons set forth hereinafter, differ in size and volume, and are provided at one end surface thereof with individual tapped openings 50, 51 closed respectively by screws 52, 53. Although containers 43, 44 are shown as substantially semicylindrical, they obviously can be of other suitable shape when so desired.

As shown more particularly in FIG. 4, the passageway formed by grooves 48, 49 is adapted to receive a length of mild detonating fuse 54, such as, for example, Du Pont's MDF two grain/foot fuse; fuse 54 having a pair of identical mild primers 55, 56 secured to opposite ends thereof and disposed adjacent one end of containers 43, 44. Primers 55, 56 are adapted to be activated in response to a suitable electric signal, with either primer being sufficient for operation of the device. It is to be understood, also, that mechanically activated primers, responsive to a suitable mechanical signal, may be employed for primers 55, 56 when so desired.

In assembling the space vehicle payload stage 10, referring back now to FIG. 1, parachute 32 and inflatable bag 20 are folded and assembled within ejector piston 34 in main vehicle casing 12. Foam generator 18, minus member 19, is positioned and secured within forward casing 11 to which nose cone 14 and instrument package 15 are attached. Fuse 54, with end attached primers 55, 56, is positioned within either of grooves 48, 49, and bulkheads 46, 47 of containers 43, 44 are secured in abutting relationship by suitable means such as an adhesive. The assembled containers are then placed within foam generator casing 18, and a foam generating resin is poured into container 44 by way of tapped opening 51. A catalyst combinable with the resin to initiate a foam reaction is poured into container 43 through tapped opening 50. The openings 50, 51 are then closed by screw plugs 52, 53, which may also be provided with O-ring seals, not shown, if desired. The disk shaped portion of member 19 may then be secured to foam generator casing 18, with the lead wires from primers 55, 56 passing through suitable openings, not shown, in foam generator casing 18 and through ejector piston 34 to an electrical energy source, not shown.

Retainer ring 41 is next secured to forward casing 11 by a plurality of rigid bolts 40, and elastomeric bag 20 is secured to the tubular portion of member 19 as described hereinbefore. Forward casing 11 is then placed in abutting relationship with main vehicle casing 12 and casings 11 and 12 are then interconnected by a plurality of shear bolts 42 projecting through casing 12 into retainer ring 41.

Specific examples of chemical ingredients, as well as the quantities thereof, which may be employed for the foam reaction, form the subject matter of the copending applicaiton of George F. Look, Serial Number 192,015, NASA Case No. 328, filed concurrently herewith, and accordingly form no part of the present invention. It suffices to merely say herein that a liquid polyether resin may be combined with an organic polyisocyanate catalyst to produce bouyant plastic foam for inflation of bag 20, and that the viscosity of the resin used is substantially the same as that of the catalyst, thereby permitting the two solutions to combine and react instantaneously upon contact of one with the other. It is well known that the volume of catalyst required in this type of chemical reaction is less than the volume of reactable resin, which accounts for the difference in size of containers 43, 44 as mentioned hereinbefore.

When the space vehicle payload stage descends through the atmosphere for water landing, delay igniter 39, which may be activated at the launch site or otherwise, as found desirable, effects ignition of small propellent charge 38. Simultaneously, primers 55, 56 are electrically activated to detonate mild detonating fuse 54 to effect instantaneous rupture of bulkheads 46, 47, thereby bringing the contents of containers 43, 44 into contact with each other over a large surface area. The plastic foam producing reaction is substantially instantaneously initiated when resin and catalyst contact each other, and the foam produced displaces a volume approximately thirty times that occupied by the reagents. This sudden increase in volume easily effects complete separation and rupture of containers 43, 44 accompanied by rapid inflation of bag 20 with a buoyant plastic foam. Since delay igniter 39 effects ignition of propellant 38 substantially simultaneously with the ignition of primers 55, 56, ejector piston 34 moves to eject the flotation system immediately prior to inflation of bag 20 by the plastic foam.

When propellent charge 38 is ignited, ejector piston 34 is propelled forwardly against retainer ring 41 to shear bolts 42 and to push the retainer ring away from casing 12 to separate forward casing 11 from casing 12. Ejector piston 34 remains with casing 12, since the forward movement thereof is restrained by flexible rope 35. Vehicle casing 12, along with booster casing 13, may be returned to Earth by means of a suitable parachute, not shown, if so desired.

Figure 5:
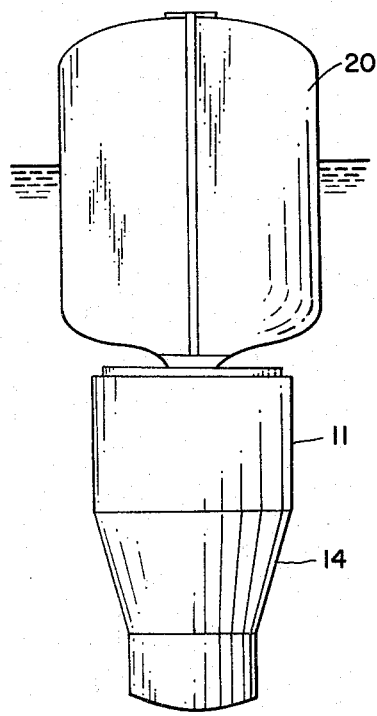

As mentioned heretofore, the foam producing reaction is substantially instantaneous, and within a matter of seconds after actuation of primers 55, 56 bag 20, which with parachute 32 has slipped out of ejector piston 34, is inflated with a buoyant plastic foam; the descent toward the water being retarded by means of parachute 32. Upon impact with the water, parachute 32 may be released by suitable impact release mechanism, not shown, and inflated bag 20 (FIG. 5) provides buoyancy for the assembly including forward casing 11, foam generator 18, attached instrument package 15, and nose cone 14.

Bag 20 may be given a brilliant orange or any other suitable color, and may further be provided with suitable soluble dye release means or electric signal transmitting means, not shown, to aid in location thereof. Also, if desired, it is within the scope of the present invention to actuate primers 55, 56 upon contact with the ocean by any suitable impact responsive means. It is also possible in numerous applications of the present invention to employ suitable mechanical rupturing devices for containers 43, 44 other than the illustrated explosive arrangement. For example, tear strips similar to those utilized to open cellophane packages may be substituted for the mild detonating fuse illustrated, with removal of the tear strips being effected by hand or otherwise.

The foam generator of the present invention obviously may be also applicable for inflation of life raft, life jackets, and various types of inflatable building structures, to mention but a few possibilities.

Obviously, many modifications and variations of the present invention are possible in the light of the above teachings. It is therefore to be understood that within the scope of the appended claims the invention may be practiced otherwise than as specifically described.

What is claimed as new and desired to be secured by Letters Patent of the United States is:

1. Apparatus for remotely combining reactive chemical ingredients, comprising: a pair of container members each having at least one ruptuarble surface in abutting relationship with the similar surface of the other container, each of said containers including means disposed within said passageway and for introducing a reactive chemical thereinto, means forming a passageway between said abutting rupturable surfaces, and means disposed within said passageway and responsive to a remote signal for rupturing substantially the entire area of said rupturable surfaces, whereby the contents of said pair of containers come into immediate chemical contact with each other, and means to receive the reaction product produced when said chemicals react.

2. In a foam generator of the type wherein a resin and a catalytic agent are combined to produce a low density plastic foam, the improvement comprising:

a tubular casing having an open and a closed end, a pair of substantially semi-cylindrical containers positioned within said casing in face abutting engagement, each of said containers being provided with an individual tapped opening in the end surface thereof adjacent the open end of said casing, said tapped openings being so constructed and arranged in said containers as to permit installation of foam producing ingredients in said containers after said containers are positioned within said casing, mild detonating fuse disposed between the abutting faces of said containers for simultaneously rupturing portions of each said container to permit intermixing of the contents thereof within said casing, a reduced diameter tubular conduit secured to the open end of said casing, and an inflatable elastomeric envelope sealingly engaged over a length of said tubular conduit for receiving the plastic foam from said casing.

3. A foam generator comprising, a casing member having an opening therein, a pair of containers in which are stored foam-producing liquid ingredients disposed within said casing member, said containers each having at least one rupturable substantially flat wall portion, said containers being positioned with said wall portions in abutting relationship, a groove in each of said rupturable wall portions forming a single sinuous passageway, mild explosive disposed within said sinuous passageway and in contact with each of said wall portions for effecting simultaneous rupture of each said wall portion.

4. A flotation assembly, comprising: an inflatable elastomeric bag, means for inflating said bag with buoyant plastic foam, said means for inflating said bag including a casing member having an opening in fluid communication with said elastomeric bag, a pair of containers in which are stored unequal volumes of plastic foam-producing ingredients positioned in abutting relationship within said casing member, grooves forming a sinuous passageway between abutting portions of said containers, means disposed within said passageway and responsive to a remote signal for simultaneously rupturing said pair of containers along the length of said passageway.

5. In combination: a foam generator comprising a casing member having an opening therein, a pair of chemical containers disposed within said casing in abutting relationship to receive foam-producing ingredients, each said chemical container having at least one rupturable surface in substantial contact with a like surface on the other of said containers, means adjacent each of said rupturable surfaces for rupturing a substantial area thereof in response to a predetermined signal, an inflatable, impervious elastomeric envelope having an opening in fluid communication with said opening in said casing member, a circumferential band frictionally retaining the opening of said envelope about a length of a tubular portion of said casing member opening, said circumferential band having an integral flared perforated skirt portion, a plurality of longitudinally extending ribbons secured to said envelope and passing through said perforated skirt, each of said ribbons terminating in a closed loop beneath said flared skirt portion, and a circumferential ring member threaded through each individual loop and maintained snugly about said tubular portion by said flared skirt.

References Cited in the file of this patent

UNITED STATES PATENTS

| | | |
|---|---|---|
| 740,317 | Rose | Sept. 29, 1903 |
| 2,642,693 | Broady | June 23, 1953 |
| 3,059,253 | Sager | Oct. 23, 1962 |

UNITED STATES PATENT OFFICE
CERTIFICATE OF CORRECTION

Patent No. 3,150,387                        September 29, 1964

George F. Look et al.

It is hereby certified that error appears in the above numbered patent requiring correction and that the said Letters Patent should read as corrected below.

Column 1, line 51, for "palyload" read -- payload --; column 2, line 26, for "the", third occurrence, read -- to --; column 4, line 53, for "bouyant" read -- buoyant --; column 5, line 38, for "thoe" read -- those --; line 55, for "ruptuarble" read -- rupturable --; lines 57 and 58, strike out "disposed within said passageway and".

Signed and sealed this 16th day of February 1965.

SEAL)
Attest:

ERNEST W. SWIDER                                    EDWARD J. BRENNER
Attesting Officer                                        Commissioner of Patents